United States Patent [19]

Wong et al.

[11] Patent Number: 4,570,987
[45] Date of Patent: Feb. 18, 1986

[54] SWIVEL EYEBOLT

[76] Inventors: Hon Wong, 920 Jacmar Dr., Montebello, Calif. 90640; Shui K. Tsui, Walnut Grove Ave., Rosemead, Calif. 91770

[21] Appl. No.: 609,898

[22] Filed: May 14, 1984

[51] Int. Cl.⁴ .............................................. B23B 43/00
[52] U.S. Cl. .................................... 294/1.1; 403/164; 410/85; 410/101; 248/499; 248/500
[58] Field of Search ...................... 294/1 R, 74, 82.11; 248/499, 500, 503.1, 59, 505; 410/101, 113, 114, 85; 403/119, 164; 24/115 K

[56] References Cited
U.S. PATENT DOCUMENTS 240,380  4/1881  Buck ..................................... 403/164
3,297,293  1/1967  Andrews et al. ................... 248/361
4,431,352  2/1984  Andrews ............................ 248/499

Primary Examiner—James B. Marbert
Attorney, Agent, or Firm—Beehler, Pavitt, Siegemund, Jagger & Martella

[57] ABSTRACT

The invention involves a swivel eyebolt of the type which relies on a threaded stud to anchor a bonnet and accompanying ring to a load allowing the bonnet 360° or rotation. Of special consequence is the structure which features a bushing applied around the exposed part of the stud and held in place by the head of the stud so that a flange on the bushing engages the load. The bonnet in turn is clamped rotatably on the bushing so that the bonnet in fact rotates about the bushing as well as about the stud.

8 Claims, 5 Drawing Figures

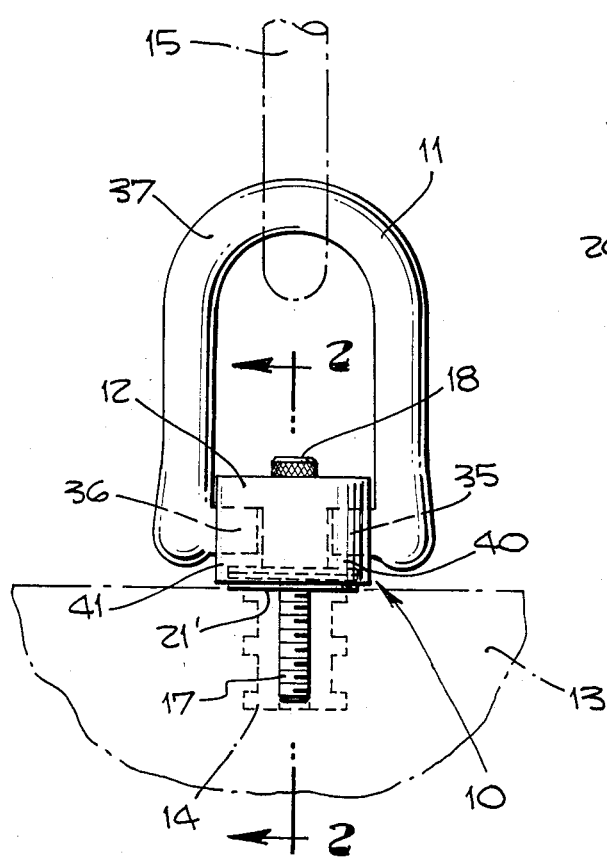
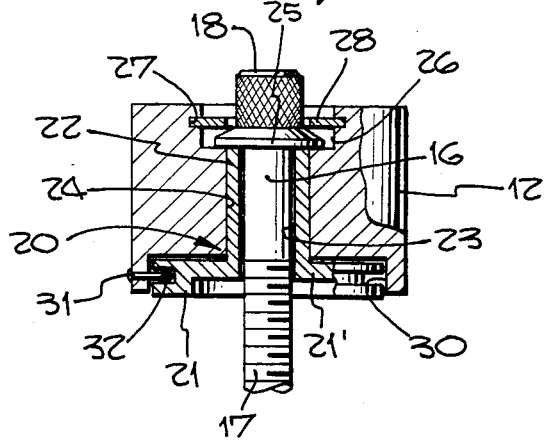
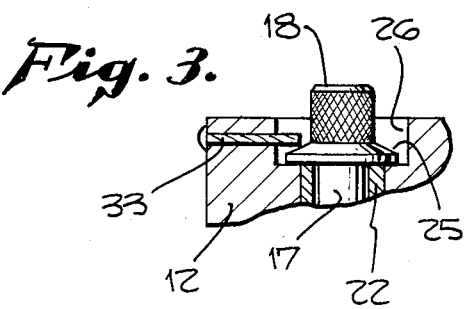
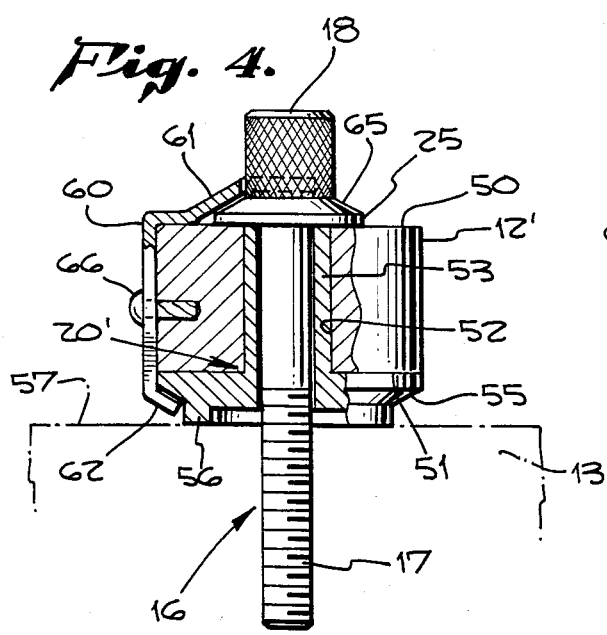
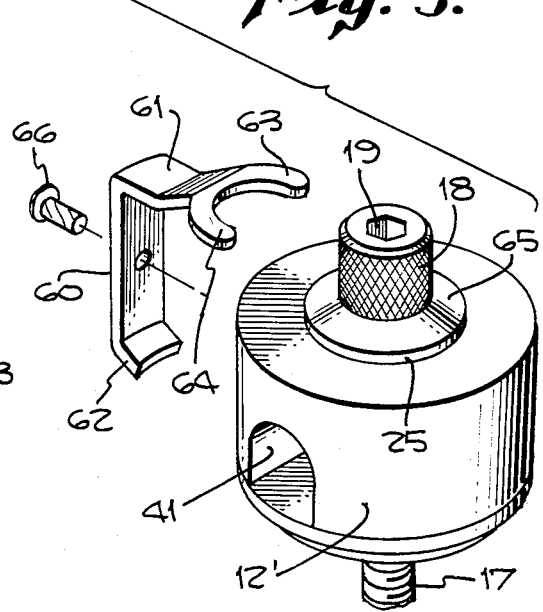

SWIVEL EYEBOLT

The invention has reference to a multi-position fixture of a type adapted to be anchored to a load and used for one purpose or another, such, for example, as lifting the load by use of a sling or fastening the load on the body of a truck or trailer for transportation. The multi-position fixture, moreover, is a versatile type of fixture adapted for a great variety and types of load, relatively heavy loads in particular being advantageously served by the fixture. Contributing to the versatility of the fixture is a structure which provides a ring capable of rotating throughout a complete 360-degree arc, and at the same time capable of being swung throughout an arc of substantially 180 degrees in a direction perpendicular to the 360 degree arc, irrespective of the manner in which the fixture is attached to the load, wherein the full strength of critical parts has been preserved.

This is an improvement on the structure of U.S. Pat. No. 3,297,293 and application Ser. No. 500,028, filed June 1, 1983.

Among the objects of the invention is to provide a new and improved full strength multi-position fixture for fixed attachment to a load, and which is provided with a tie ring, the ring, in company with a portion of the fixture, being such that it can swing freely in different directions, depending to a degree on the direction which the tie needs to assume.

Another object of the invention is to provide a new and improved full strength multi-position fixture capable also, by reason of its attachment, of swinging througout an arc perpendicular to the plane of rotation, the assembly of parts being relatively few in number and of rugged simple construction, making the fixture one of great dependability under a wide variety of curcumstances.

Still another object of the invention is to provide a new and improved full strength multi-position fixture having relatively few parts of rugged construction, the parts being capable of fabrication by conventional tools and machining and the assembly of the same being such that the cost of production can be kept relatively low.

Still another object of the invention is to provide a new and improved multi-position full strength fixture of a design and construction such that the manufacturing operations can be held to substantially a minimum, thereby contributing appreciably not only to dependability in the assembled device but also to economy.

Still further among the objects of the invention is to provide a new and improved multi-position fixture of a versatile character enabling it to be attached to any one of a great variety of loads and which is of such construction that all of the individual parts, once brought together in assembled condition, are connected together by simple novel expedients in a manner holding them in their assembled condition until permanently fastened to the load in the selected location, the parts, moreover, being connected in manner such that by use of conventional tools they can be readily disassembled, and subsequently reassembled, should such assembly become necessary.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

In the drawings:

FIG. 1 is a vertical elevational view of the fixture shown mounted on a load.

FIG. 2 is a vertical-sectional view of the line 2—2 of FIG. 1.

FIG. 3 is a fragmentary vertical sectional view of a modified clamping structure.

FIG. 4 is a vertical-sectional view of a second form of the fixture.

FIG. 5 is a side perspective exploded view of the second form of fixture of FIG. 4.

In an embodiment chosen for the purpose of illustration, there is shown what may aptly be described as a multi-position fixture consisting of a load-engaging anchor assembly, indicated generally by the reference character 10, upon which a ring member 11 is mounted and contained by use of a bonnet in the form of a collar 12 in a fashion such that the ring member 11 can swing throughout a vertical arc of 180 degrees, as viewed in FIG. 1, and so that at the same time the collar, and consequently the ring member, can rotate throughout a full 360 degrees. Merely by way of example the load-engaging anchor assembly is shown embedded in and anchored to a load 13 which can be a mass of concrete adapted to reception of an expansion sleeve 14. The device is then ready for attachment of an appropriate tie 15 which may be in the form of a cable, hook, or other attachment capable of providing the necessary lift.

The load-engaging anchor assembly 10 previously made reference to consists in part of a stud 16, the lower portion of which consists of a threaded shank 17, the upper end being provided with a head 18. To assist in tightening and loosening the stud from position, the exterior of the head may be knurled, and also provided with a hexagonal recess 19 for reception of an appropriate conventional hexagonal wrench.

For cooperation with the stud 16, there is provided a bushing 20. For a broad stable engagement with the load 13, the bushing is provided with an annular surface 21 on a bearing flange 21'. Extending endwardly from the bearing flange is a sleeve 22, the bearing flange 21' and sleeve 22 being provided with an inner bore 23 through which the shank 17 of the stud 16 extends. An outer bore 24 in the collar 12 provides an annular cylindrical space which accommodates the sleeve 22.

The collar 12, previously identified, extends around the sleeve 22, and is held in position by an annular shoulder 25 beneath the head 18.

A depression 26 at the end of the collar 12 adjacent the head 18 accommodates the shoulder 25 and part of the head 18. An annular recess 27 in the side wall of the depression is adapted to receive a retaining snap ring 28 which bears against the outer side of the shoulder 25. On the opposite face of the collar is a second depression 30 having a depth less than the thickness of the flange 21' which is located in the depression. A roll pin 31 in the collar extends into an annular recess 32 in the outer edge of the flange 21 to assist in retaining the collar assembled on the bushing.

By providing the retaining expedients as described, the operating parts are held in the necessary assembled relationship during shipment and handling, prior to being anchored to the load, the parts, therefore, not being easily mislaid.

In the modified form of FIG. 3 a drive pin 33 is made use of extending into the depression 26 to overlie the annular shoulder 25. With this structure the annular recess 27 can be dispensed with.

The ring member 11, frequently identified as a hoist ring, eye-bolt, or U-bar, in order to provide an adequate safety factor, is preferably of forged steel. As a U-bar, pivot pin 35 and 36 are forged simultaneously with the forging of ring member, and at the end of the ring member opposite from a loop 37. Radially inwardly directed end faces of the respective pins 35 and 36 are spaced from each other a distance something in excess of the outside diameter of the sleeve 22. For holding the pivot pins in operative position, the collar 12 is provided with diametrically opposite bearing recesses 40 and 41, the bearing recesses having a breadth slightly in excess of the diameter of the pivot pins so that the pins are adapted to pivot freely within the recesses, the pins and recesses being in axial alignment.

So that the collar can rotate freely about the sleeve 22 the bottom of the depression 26 is beneath the annular shoulder 25 and the pin 31 can slide freely in the annular recess 32. It is also of consequence to note that the length of the sleeve 22 is something in excess of the length of the bore 24 so that the shoulder 25 cannot be drawn into binding engagement with the collar when the stud 16 draws the shoulder 25 snugly against the sleeve 22 and forces the flange 21 into engagement with the load 13. With this arrangement the collar remains free to rotate its full 360 degrees, enabling the ring member 11 likewise to rotate the full 360 degrees, while at the same time being capable of swinging for substantially 180° about the axis of the pivot pins 35 and 36.

In the form of invention shown in FIGS. 4 and 5 a collar 12' is employed with a bushing 20' of slightly different design. In this design the collar 12' has parallel plane upper and lower faces 50 and 51. A central bore 52 accommodates a sleeve 53 of the bushing 20' to provide a rotatable fit.

On this occasion the perimeter of a flange 54 on the bushing is beveled to provide an annular retaining surface 55. Adjacent the surface 55 is an annular bearing ridge 56 spaced radially outwardly from the stud 16 for additional strength and stability. The head 18 of the stud, acting through the shoulder 25 holds the bearing ridge 56 in engagement with the adjacent surface 57 of the load 13.

For holding the several parts in assembled condition there is provided a bracket 60 having an outer radially inwardly extending leg 61 and a second inner leg 62. The inner leg 62 underlies the flange in rotatably traveling engagement with the retaining surface 55. Two fingers 63 and 64 on the outer leg 61 overlie a beveled retaining surface 65 on the shoulder 25 as an additional retaining expedient. A drive pin 66 is employed to hold the bracket 60 in position on the collar 12'.

Although the load has been identified as a concrete mass, it should be appreciated that the threaded shank of the stud can be as readily threaded into the tapped hole of metallic material such as large dies and fixtures, heavy machinery and structural members. The hoist ring assembly or swivel eye-bolt, for such it is, can be as readily attached to mobile equipment, cargo slings, or virtually any kind of load which needs to be either lifted or to be tied in place.

While particular embodiments of the invention have been shown and described, it will be obvious to those skilled in the art that changes and modifications may be made without departing from the invention in its broader aspects, and therefore, the aim of its appended claims is to cover all such changes and modifications as fall within the true spirit and scope of the invention.

Having described the invention, what is claimed as new in support of Letters Patent is as follows:

1. A multi-position fixture of multiple parts for fixed attachment to a load member comprising a load-engaging stud, a collar having a swivel engagement with the stud and adapted to rotate throughout substantially a full circle, recess means in said collar, a ring component, a portion of said ring component comprising a transversely extending pivot pin structure disposed in said recess means and movable in said recess means throughout an arc of substantially a half circle for all positions of rotation of said collar, said pivot pin structure comprising substantially homogeneous portions of said ring member, the pivot pin portion of said structure comprising a pair of radially inwardly directed pivot pins in axial alignment, inner ends of said pins being spaced from each other on opposite sides of said collar, said stud having a head and a shank, said shank having a continuous and uninterrupted threaded section, a bushing on said stud and within said collar, a portion of said bushing comprising bearing means between the collar and the load member and retention means connected respectively between said bushing and said collar for holding said parts in assembled condition prior to attachment to said load member.

2. A multi-position fixture of multiple parts for fixed attachment to a load member comprising a load engaging stud having a shank in anchored engagement with said load member and a head, said shank having an exteriorly threaded section, said section having the same diameter throughout its length, a collar having a swivel engagement with the stud and adapted to rotate throughout substantially a full circle, a ring component, a pivot connecting structure between the collar and the ring component, said ring component being swingable about said collar throughout an arc of substantially a half circle for all positions of rotation of said collar, a bushing comprising a substantially cylindrical sleeve and a flange at one end of the sleeve, said collar having an axial bore forming an annular cylindrical space around the stud adjacent the head, said sleeve being interposed between the collar and the stud within said annular space, said flange being located between the load member and an adjacent face of the collar and retention means forming a connection between said collar and said bushing for holding said parts in assembled condition prior to attachment to said load member.

3. A multi-position fixture as in claim 2 wherein there is a retaining accessory between the head and the bushing at the outer end of the sleeve.

4. A multi-position fixture as in claim 2 wherein said retention means comprises an annular recess in the flange and a projection on the collar extending into said annular recess.

5. A multi-position fixture as in claim 3 wherein said retaining accessory is a releasable snap ring and there is a depression at the end of the collar adjacent the head having a circumferential wall, said wall having therein an annular recess receptive of said snap ring.

6. A multi-position fixture as in claim 3 wherein said retention means comprises a bracket having an attachment to the collar, said bracket having radially inwardly extending outer and inner legs, said outer legs having a circumferentially slidable retention engagment with said retaining accessory.

7. A multi-position fixture as in claim 2 wherein said retention means comprises a bracket having an attachment to the collar, said bracket having radially inwardly extending outer and inner legs, said inner leg having a circumferentially slidable retention engagement with the flange of said bushing.

8. A multi-position fixture as in claim 3 wherein said retention means comprises a bracket having an attachment to the collar, said bracket having radially inwardly extending outer and inner legs, said outer leg having a position overlying the retaining accessory and in slidable retaining engagement therewith, and said inner leg having a position underlying the flange of said bushing and in sliding retaining engagement therewith.

* * * * *